United States Patent Office 3,252,997
Patented May 24, 1966

3,252,997
PURIFICATION OF SULFOLANE COMPOUNDS
Werner Ridderikhoff and Heinz Voetter, Amsterdam, Netherlands, assignors to Shell Oil Company, New York, N.Y., a corporation of Delaware
No Drawing. Filed June 26, 1962, Ser. No. 205,190
Claims priority, application Netherlands, Dec. 29, 1961, 273,043
4 Claims. (Cl. 260—332.1)

This invention relates to a process for the purification and stabilization of sulfolane compounds by subjecting these compounds to heat treatment and removing the resulting decomposition products by distillation.

It is known that sulfolane and its homologs, particularly sulfolane compounds containing lower alkyl groups (1 to 4 carbon atoms) as substituents, such as methylsulfolane and dimethylsulfolane, can be used for various industrial purposes, especially as solvents for extractions and extractive distillations in oil processing. It is also known that moisture and dissolved gases such as carbon dioxide and sulfur dioxide may be removed by heating of the sulfolanes at very low pressures (1 mm. Hg or less) at a temperature of 100° C. for short time periods.

The technical grade sulfolane compounds available for use in extractive distillations generally contain small amounts of impurities which slowly decompose during the use of the sulfolane compounds. This decomposition produces sulfur dioxide and other harmful compounds which may cause troublesome side reactions and are particularly undesirable because of their increased corrosion effects. This slow decomposition to form corrosion-inducing impurities has been found to be particularly adverse in those processes wherein the sulfolanes are held for relatively long periods of time at the high temperatures. Such conditions frequently occur in extraction and extractive distillation processes and result in corrosive deterioration of the process equipment.

It is an object of the present invention to provide a convenient process for the purification and stabilization of sulfolane compounds. A special object of the present invention is to provide a process for the purification of sulfolane compounds which can be readily adapted to the treatment of large masses of sulfolanes, such as are encountered in commercial extraction processes. Another special object is to provide a method for stabilizing sulfolanes against deterioration during shipment, storage, and use.

It has now been found that crude sulfolane compounds can be purified in a very simple manner by heating the sulfolanes at a temperature of from at least 140° C. up to the decomposition temperature of the sulfolanes for at least five hours and either simultaneously or subsequently separating the resulting decomposition products (along with any impurities originally present in the starting material) by distillation.

The sulfolane compounds which may be purified according to the process of the present invention include sulfolane and its homologs. Sulfolane and sulfolane homologs are described in U.S. Patent 2,451,298, issued October 12, 1948, to Morris et al. These compounds may be prepared by reacting sulfur dioxide with a suitable conjugated alkadiene such as butadiene, isoprene, or trans-piperylene (1,3-pentadiene) and hydrogenating the resulting sulfolene compound to a sulfolane compound. The sulfur dioxide-alkadiene reaction may be carried out in a suitable solvent such as isopropyl alcohol.

For example, butadiene (or other 1,3-diolefin) is first converted into a sulfolene by reaction with sulfur dioxide. The sulfolene so formed is then hydrogenated to a sulfolane. The conversion into a sulfolene is generally carried out under superatmospheric pressure, the liquid butadiene (or similar diolefin) being gradually added to liquid sulfur dioxide at a temperature between 70° C. and 120° C. The liquid sulfur dioxide may be diluted with a solvent such as isopropyl alcohol. After completion of the reaction of butadiene and sulfur dioxide, the pressure is released and any unreacted butadiene and sulfur dioxide is removed. The sulfolene so obtained may be further diluted with a solvent such as isopropyl alcohol and then hydrogenated to sulfolane in the presence of a catalyst such as Raney nickel. The process conditions are usually chosen so that prior to the hydrogenation step the sulfolene is stripped not only of all of the unconverted sulfur dioxide and butadiene, but also of other impurities, such as insoluble sulfones and other conversion products which may have an adverse effect on the life of the particular hydrogenation catalyst being used. Despite this pretreatment, however, the crude sulfolane so produced generally contains, in addition to a certain concentration of unconverted sulfolene, a number of impurities such as ethers and polymeric substances. It is presumably the unconverted sulfolene and part of the other contaminants, possibly sulfolanyl ethers, which slowly decompose with the formation of sulfur dioxide and other undesirable products when the sulfolane compounds are used.

The process of the present invention is particularly suitable for the purification of very large quantities of crude sulfolane. Amounts of sulfolane of from 50 to 150 tons may be purified in one batch, or the process may be conducted continuously to purify even larger amounts of sulfolane.

The heating step of the present invention is continued for a period of from five to fifty hours and preferably for from fifteen to fifty hours at temperatures of from 140° C. to 240° C., preferably from 150° C. to 220° C. After the heat treatment step, the volatile decomposition products are removed from the sulfolane by distillation. Some of these volatile decomposition products, especially sulfur dioxide, appear to be stubbornly held by the sulfolane, and their removal can be facilitated by passing a stripping gas through the impure sulfolane during distillation. Any inert gas may be used for this purpose. Suitable stripping gases include nitrogen and light inert hydrocarbon gases such as butane. During both the heat treatment and distillation of the sulfolane, care should be taken to keep the temperatures below the decomposition temperature of sulfolane. Accordingly, temperatures above about 230° C. are generally not used.

The volatile decomposition products may be removed as they are formed in the heat-treating process by heating the crude sulfolane in a distillation apparatus. When this method of heat-treating is employed, the crude sulfolane is heated in the bottom of a distillation column at a temperature of at least 140° C. for five or more hours and the undesirable volatile components are simultaneously removed at the top of the column. When this practice is followed, the temperature at the top of the distillation column is adjusted so that practically no sulfolane distills over. This procedure has the advantage of providing for the instant removal of any volatile compounds which may have been originally present in the crude sulfolane and at the same time continuously removing the volatile compounds formed during the heat treatment of the sulfolanes.

The heat-treatment step of the process of the present invention may be conducted under atmospheric pressure or at subatmospheric pressures, the pressure being further reduced as the heat treatment proceeds.

In addition to the thermally unstable impurities which decompose during heat treatment, commercial sulfolane generally contains polymers, ethers, and other compounds with a higher molecular weight or with a higher boiling point than sulfolane. Such compounds can be separated in a simple manner as residue after the removal of the volatile contaminants by merely raising the bottom temperature of the distillation column and distilling over the sulfolane, leaving the higher boiling contaminants behind. This distillation is preferably carried out under reduced pressure in order to prevent decomposition of the sulfolane. While distillation is not the only method of separating the heat-treated sulfolane from the decomposition products formed, one advantage attaching to distillation is that there is then no need for filtration of the sulfolane. If distillation is not employed, it is generally necessary to remove the insoluble constituents formed during the heat treatment by filtration or some other form of mechanical separation.

For certain uses of sulfolane it is not essential that the above-mentioned high molecular weight compounds be removed. For example, when sulfolane is used as an extractant, these compounds appear to have only a diluent action which may be compensated for (with a view to attaining a greater selectivity) simply by choosing a somewhat higher solvent ratio.

Depending upon the nature and amount of the impurities to be removed from the crude sulfolane compounds, the temperature and pressure during the heat treatment and distillation may be simultaneously regulated. The process may take less time when a high temperature is combined with a low pressure than, for instance, at a low temperature with atmospheric pressure. A very suitable combination comprises conducting the heat treatment at from 175° C. to 185° C. with a pressure which is gradually reduced from atmospheric pressure down to 50 to 100 mm. of Hg. With temperatures of from 175° C. to 185° C. sulfolane can be distilled over at a vacuum of approximately 20 mm. Hg, and the pressure reduction can therefore be decreased from 50 to 20 mm. Hg for distillation.

*Example*

Sulfolane was produced by a two-step process of first reacting sulfur dioxide and 1,3-butadiene to form sulfolene, and then catalytically hydrogenating the sulfolene to sulfolane. Accordingly, liquid butadiene was gradually added to a solution of liquid sulfur dioxide in isopropyl alcohol preheated to 100–150° C. As the reaction proceeded, the temperature was slowly lowered to 75° C., but the pressure was maintained at about 12 atmospheres. After completion of the reaction, the pressure was released so that most of the unconverted butadiene, sulfur dioxide, and a part of the isopropyl alcohol evaporated. Next, nitrogen at a temperature of approximately 60° C. was passed through the reaction mixture to further remove unreacted butadiene and sulfur dioxide. The crude sulfolene was filtered to remove insoluble polysulfones and then neutralized. The sulfolene-containing mixture was cooled to 30° C., transferred to a stirred reactor and, while hydrogen was slowly introduced, hydrogenated with the aid of a Raney nickel catalyst. The catalyst was removed by filtration leaving a solution of sulfolane in isopropyl alcohol which contained about 2% by weight of unconverted sulfolene. After evaporation of the greater part of the isopropyl alcohol at about 80° C., about fifty tons of the crude sulfolane was introduced into a distillation column. The crude sulfolane was gradually heated to a temperature of 180° C. under atmospheric pressure by recycling through a high-pressure steam heat exchanger. The crude sulfolane was held at about 180° C. for 48 hours. Under these conditions, the temperature at the top of the distillation column was 40° C. The distillate obtained during the heating-up period and the heat treatment at 180° C. contained 4% by weight of sulfolane, the remainder being composed of aqueous isopropyl alcohol contaminated with a high concentration of sulfur dioxide. During the heat treatment at 180° C., the pressure was gradually reduced from atmospheric pressure to 50 mm. Hg. After the heat-treatment step, the pressure in the distillation column was further lowered to 20 mm. Hg, while the temperature was kept constant at 180° C. After an aqueous first distillate, pure sulfolane was obtained. The distillation was continued until the amount of liquid remaining in the bottom part of the distillation column was about two tons, whereupon a fresh batch of crude sulfolane was introduced together with the aqueous first distillate. When ten batches of fifty tones each had been treated in this fashion, the material balance was as follows:

| | Tons |
|---|---|
| Purified sulfolane | 450 |
| Gaseous decomposition products and aqueous isopropyl alcohol | 35 |
| First distillate (of the last batch) | 5 |
| Residue | 10 |
| Total | 500 |

The properties of the purified sulfolane thus obtained were as follows:

| | |
|---|---|
| Melting point, ° C. | 25.5 |
| Specific gravity at 30° C. | 1.265 |
| Refractive index at 30° C. | 1.4720 |
| Water, percent by weight | 0.1 |
| Ethers, percent by weight | 0.2 |
| Sulfur, percent by weight | 25.8 |
| ASTM distillation: | |
| Percent by volume at 272° C. | 1.5 |
| Percent by volume at 275° C. | 95 |

We claim as our invention:

1. A process for the production of sulfolane in a purified and stabilized form from sulfolane made by reacting butadiene with sulfur dioxide, stripping the resulting sulfolene of unreacted butadiene, sulfur dioxide and other impurities and hydrogenating the sulfolene to sulfolane containing small amounts of impurities which slowly decompose with formation of sulfur dioxide and other undesirable compounds, which comprises:

(a) heating the crude sulfolane at a temperature from 150° C. to 220° C. for a period of from 15 to 50 hours while simultaneously reducing the pressure during the heating period from atmospheric pressure to from 50 to 100 mm. Hg at the end of the heating period to form lower boiling decomposition products, and (b) removing said decomposition products from the sulfolane by distillation at a pressure of 50 to 100 mm. Hg.

2. A process in accordance with claim 1 wherein the crude sulfolane is heated at a temperature of from 175° C. to 185° C. for a period of from 40 to 50 hours.

3. A process for the production of sulfolane in a purified and stabilized form from sulfolane made by reacting butadiene with sulfur dioxide, stripping the resulting sulfolene of unreacted butadiene, sulfur dioxide and other impurities and hydrogenating the sulfolene to sulfolane containing small amounts of impurities which slowly decompose with formation of sulfur dioxide and other undesirable compounds, which comprises:

(a) heating the crude sulfolane at a temperature from 150° C. to 220° C. for a period of from 15 to 50 hours while continuously reducing the pressure from atmospheric pressure to from 50 to 100 mm. Hg at the end of the heating period to form volatile and non-volatile decomposition products, (b) simultaneously removing the volatile decomposition products during the heating of the crude sulfolane, (c) removing the sulfolane from the non-volatile decomposition products by distillation at a temperature of from 175° C. to 185° C. and a pressure of from 20 to 50 mm. Hg, and (d) removing said decomposition products from the sulfolane by distillation at a pressure of 50 to 100 mm. Hg.

4. A process in accordance with claim 3 wherein the crude sulfolane is heated at a temperature of from 175° C. to 185° C. for a period of from 40 to 50 hours.

References Cited by the Examiner
UNITED STATES PATENTS

| | | | |
|---|---|---|---|
| 2,233,999 | 3/1941 | Farlow | 260—332.1 |
| 2,435,404 | 2/1948 | Morris et al. | 260—332.1 |
| 2,451,298 | 10/1948 | Morris et al. | 260—332.1 |
| 2,471,077 | 5/1949 | Moore et al. | 260—332.1 |
| 2,502,934 | 4/1950 | Elam et al. | 260—332.1 |
| 2,912,457 | 11/1959 | Blaser et al. | 260—475 |

WALTER A. MODANCE, *Primary Examiner.*

NICHOLAS S. RIZZO, *Examiner.*

JOHN T. MILLER, JAMES A. PATTEN,
*Assistant Examiners.*